United States Patent [19]

Araseki

[11] Patent Number: 4,713,776
[45] Date of Patent: Dec. 15, 1987

[54] SYSTEM FOR SIMULTANEOUSLY CODING AND DECODING A PLURALITY OF SIGNALS

[75] Inventor: Takashi Araseki, Tokyo, Japan

[73] Assignee: NEC Corporation, Tokyo, Japan

[21] Appl. No.: 610,729

[22] Filed: May 16, 1984

[30] Foreign Application Priority Data

May 16, 1983 [JP] Japan .................................. 58-85293
May 19, 1983 [JP] Japan .................................. 58-88007

[51] Int. Cl.$^4$ .............................................. G10L 5/00
[52] U.S. Cl. ................................ 364/513.5; 381/31; 375/122
[58] Field of Search .................................. 381/29–32, 381/36–40; 375/25, 121, 122; 370/79, 118

[56] References Cited

U.S. PATENT DOCUMENTS

| | | | |
|---|---|---|---|
| 4,048,443 | 9/1977 | Crochiere | 381/37 |
| 4,142,071 | 2/1979 | Croisier | 381/29 |
| 4,184,049 | 1/1980 | Crochiere | 381/31 |
| 4,216,354 | 8/1980 | Esteban et al. | 381/31 |
| 4,381,428 | 4/1983 | Kolesar et al. | 344/513.5 |
| 4,535,472 | 8/1985 | Tomcik | 381/31 |
| 4,538,234 | 8/1985 | Honda et al. | 381/31 |

Primary Examiner—Emanuel S. Kemeny
Attorney, Agent, or Firm—Sughrue, Mion, Zinn, Macpeak & Seas

[57] ABSTRACT

In a multi-channel system, a transmitting encoder includes an adaptive quantizer for each channel, an adaptive bit-allocator operating common to all channels using an update algorithm, and a multiplexer which rearrange signals responsive to bit-allocation information which in turn is not transmitted. At the receiving decoder, bit-allocation information is recovered by logic using the transmitter update algorithm. Four embodiments are disclosed.

8 Claims, 13 Drawing Figures

SYSTEM FOR SIMULTANEOUSLY CODING AND DECODING A PLURALITY OF SIGNALS

BACKGROUND OF THE INVENTION

This invention relates to a system for simultaneously coding and deconding a plurality of signals and more particularly to a system in which a voice signal is divided into a plurality of bands so as to efficiently code and decode the voice signals.

Adaptive quantizing is widely used to efficiently code and decode signals, especially when the level of the signal varies greatly.

According to one example of adaptive quantization, an automatic gain control (AGC) circuit is placed before a quantizer. The AGC circuit decreases its gain for large signal amplitude and increases its gain for small signal amplitude of the original. As a result, the level variation of the input to the quantizer is suppressed even when the input signal level varies greatly. Consequently, the quantization distortion can be minmized, even with a small number of quantization bits.

According to another example of adaptive quantization, the spacing of quantization (step size) of the quantizer is adaptively varied, thereby attaining substantially the same effects as the former method based on the AGC circuit. In the adaptive quantization utilizing the AGC circuit, the step size or quantization spacing is related to the gain of the AGC circuit as will be described later. The term "quantization bit number" is used herein to mean the number of levels spaced from each other by a given step size. Taking the quantization bit number being 4 and the quantization spacing being d, for instance, a scheme may be conceivable wherein $+1$ to $+4$ levels and $-1$ to $-4$ levels with spacing d between adjacent levels are set for quantization with respect to a reference of zero level.

Although in the foregoing, a case wherein a single signal is quantized has been considered, there are many cases wherein two types of signals are quantized, as in stereo broad-casting, or when the bandwidth of a single signal is divided into two. In such cases, quantization with small distortion can be realized by assigning the quantization bit number in accordance with the level difference between two signals. One example of such an encoding method is sub-band coding (SBC). According to this coding method, a signal is divided into a number of bands (that is sub-bands) and then the sub-bands are coded separately. This method is detailed in U.S. Pat. No. 4,142,071 to Alain Croisier et al entitled "Quantizing Process with Dynamic Allocation of the Available Bit Resources and Device for Implementing said Process" and will not be described herein. In conclusion, according to this method, it is necessary to transmit to the decoding side information regarding the quantization bit number assigned to each sub-band at the time of coding.

The method of varying the number of assigned bits according to the amplitude of signals is termed "adaptive bit assignment". The above-referenced U.S. Patent describes that when the adaptive bit assignment is made, transmission quality can be improved but hardware becomes complicated and the adaptive bit assignment is not always the best method.

As will be described later in detail with reference to the accompanying drawing, use of the adaptive bit assignment can decrease quantization distortion but it requires transmission of information regarding bit assignment and complicated circuits.

Moreover, since it is necessary for a bit assignment circuit to suppress the greatly varying input signals for quantization bit number reduction purposes, the signal in a quantizer must be so delayed as to maintain synchronization between the quantizer and the bit assignment circuit.

SUMMARY OF THE INVENTION

Accordingly, it is an object of this invention to provide a novel system for simultaneously coding and decoding two or more signals capable of minimizing the effect of quantizing distortion by adaptively assigning bits in accordance with the levels of two signals, thereby eliminating the necessity of transmitting bit assignment information and simplifying the construction.

Another object of this invention is to provide a system of sub-band coding and decoding having a simplified construction and a small delay.

According to this invention, there is provided a two channel simultaneous coding and decoding system including an encoder unit and a decoder unit. The encoder unit is provided with first and second adaptive quantizers for quantizing first and second digital signals while sequentially updating step sizes thereof.

The encoder unit further includes an adaptive bit assignment circuit which is inputted with information signals the step size of the first and second adaptive quantizers for adaptive assignment of corresponding numbers of bits, and a mulitplexer supplied with output signals of the first and second adaptive quantizers for rearranging these output signals in accordance with an output signal of the adaptive bit assignment circuit and delivering an encoder output signal.

The decoder unit is provided with a demultiplexer supplied with the encoder output signal for rearranging the supplied signal and outputting signals corresponding to the first and second adaptive quantizers, respectively.

The decoder unit further includes first and second adaptive inverse quantizers supplied with output signals of the demultiplexer means for inversely quantizing the corresponding output signals while sequentially updating the step size.

According to the present invention, two channel signals are adaptively quantized and transmitted. Bit assignment for the two channel signals is not transmitted from the encoder to the decoder. Rather, bit assignment is achieved by comparing step sizes of the first and second adaptive quantizer in the encoder unit. Bit assignment in the decoder unit is achieved in the same manner as in the encoder unit, with the same adaptive algorithm, to reduce quantization distortion.

DESCRIPTION OF THE PREFERRED EMBODIMENTS

Before describing the present invention, one example of the prior art system of coding and decoding two channel signals by utilizing adaptive bit assignment will be described with reference to FIG. 1. The left half thereof shows an encoder while the right half shows a decoder. In the encoder, two types of signals are inputted into terminals 1 and 2. A bit assigning circuit 10 responds to amplitudes of two input signals so as to determine the quantization step size and the quantization bit number of respective quantizers 20 and 30. In this case, it is assumed that the sum of the bit numbers assigned to both channels is constant. The algorithm that determines the quantization step size and the quantization bit number is described in the above-referenced U.S. Patent. A multiplexer 40 is inputted with an information signal regarding quantization sent from the bit assigning circuit 10, an output signal of the quantizer 20 and an output signal of the quantizer 30. The multiplexer 40 rearranges these signals and delivers an output signal. The output signal of the multiplexer 40 is transmitted through an output terminal 3 to be applied to the decoder through its input terminal 4.

In the decoder, there is provided a demultiplexer 50 which distributes the received signal amoung an inverse quantizer 60 and an inverse quantizer 70 in accordance with the information regarding bit assignment.

These inverse quantizers operate in a manner inverse to the operation of the quantizers 20 and 30 of the encoder. That is, they regenerate the original signals from the quantized signals. Furthermore, the demultiplexer 50 derives the information regarding the quantization step size and applies it to the inverse quantizers 60 and 70. In this manner, signals matched with those terminals 1 and 2 are regenerated at terminals 5 and 6. With this circuit, the quantization distortion can be reduced as compared to a case wherein the same number of bits is always assigned to signals inputted to terminals 1 and 2. More particularly, where the signal inputted to terminal 1 is larger than that inputted to terminal 2, the bit number assigned to the quantizer 20 is larger than that assigned to the quantizer 30 so that the ratio of signal to quantization distortion (SN ratio) increases. On the othere hand, the SN ratio of the signal appearing at terminal 6 decreases but the degradation of qualtiy of the signal as a whole is mitigated since this signal is small. A more detailed theoretical description is given in the above-referenced U.S. Patent. However, the circuit shown in FIG. 1 still has the aforementioned defects of the prior art.

Figure 2:
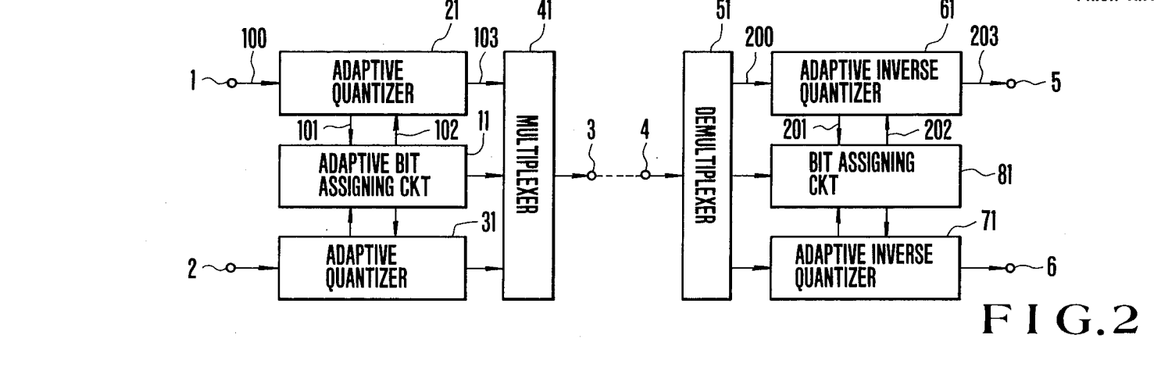
FIG. 2 is a block diagram showing a first embodiment of this invention.
Figure 3:
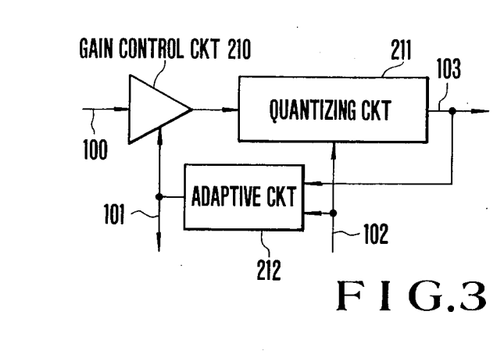
FIGS. 3 and 4 are block diagrams respectively showing an adaptive quantizer and an adaptive inverse quantizer utilized in the first embodiment.
Figure 4:
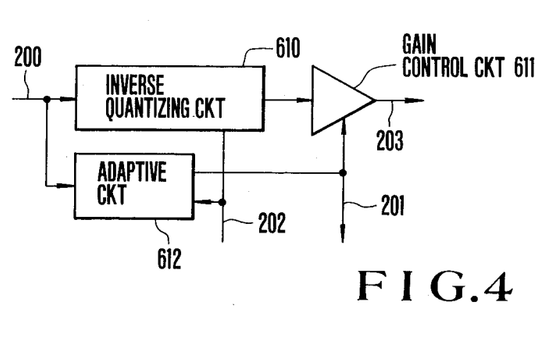

A preferred embodiment of a simultaneous coding and decoding system according to this invention will now be described with reference to FIG. 2. FIG. 3 shows one example of adaptive quantizers 21 and 31 shown in FIG. 2, and FIG. 4 shows one example of adaptive inverse quantizers 61 and 71 shown in FIG. 2.

More particularly, a signal 100 inputted to terminal 1 is quantized by an adaptive quantizer 21. The signal 100 is multiplied with the reciprocal, $1/\Delta_j$, of a step size $\Delta_j$ in a gain control circuit 210, where j represents a sampling time. The step size $\Delta_j$ is subject to an algorithm to be described later so that the gain control circuit 210 operates as an AGC circuit. The output signal of the gain control circuit 210 is applied to a quantizing circuit 211 to be quantized and the quantizing circuit 211 delivers a quantized signal 103 which is a coded signal representative of an l-th quantization level. The signal 103 is applied to an adaptive circuit 212. The quantization bit number in the quantizing circuit 211 is so controlled as to range from 2 to 6 bits by a signal 102 sent from an adaptive bit assigning circuit 11. To increase the bit number, bits are added on the side of the least significant bit (LSB) in consideration of improvement of resolution in quantization. The adaptive circuit 212 updates or renews the step size according to the following equation:

$$\Delta_{j+1} = (\Delta_j)\beta \cdot M(l) \qquad (1)$$

where $\beta$ is a positive value smaller than 1 (one) and $M(l)$ is a value of about 0.8 to 2.5 determined by l.

Figures 5, 6:
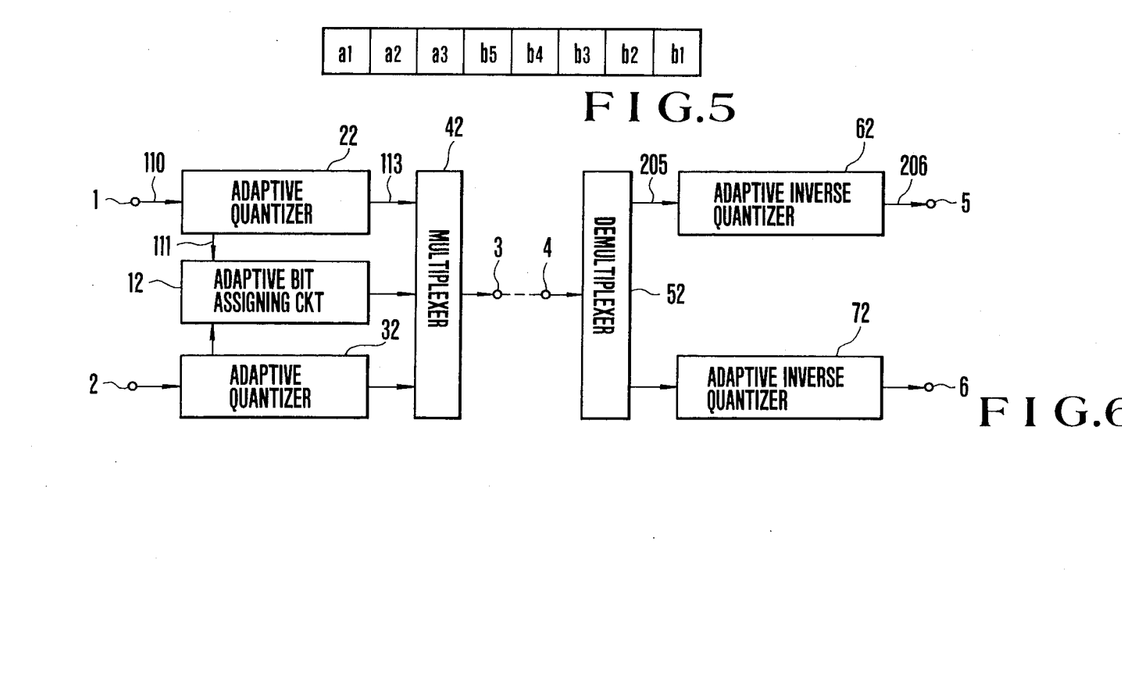
FIG. 5 shows the output of the multiplexer 41 shown in FIG. 2.
FIG. 6 is a block diagram showing a second embodiment of this invention.

Equation (1) represents an algorithm proposed by D.J. Goodman et al and described in detail in a paper of a title "A robust adaptive quantizer", IEEE Transactions on Communications, Vol. COM-23, pp. 1362–1365, 1975. To explain this algorithm briefly, let us consider the quantization level scheme having the zero reference level as described previously. When the result of quantization assumes a low level close to the zero reference lever, $M(l)$ is made to be less than 1 (one) whereas when the result of quantization assumes a high level remote from the zero reference level, $M(l)$ is made to be larger than 1 (one). Then, $\Delta_{j+1}$ changes to a larger value when a large signal is inputted but to a smaller value when a small signal is inputted. The constant $\beta$ is used for invalidation of past states so as to gradually decrease the effect of the bit error at the time of transmission. Accordingly, the gain control circuit 210 can operate as an AGC circuit. The output signal 101 of the adaptive circuit 212 is applied to the adpative bit assigning circuit 11. Signal 103 delivered out of the quantizing circuit 211 is sent to a multiplexer 41. A signal inputted to a terminal 2 is applied to an adaptive quantizer 31 where it is quantized in the same manner as in the adaptive quantizer 21. The adaptive bit assigning circuit 11 compares the step sizes outputted from two adaptive quantizers 21 and 31 for determining the number of bits assigned to each of the adaptive quantizers 21 and 31. A total of 8 bits per one sample is assigned to each of the adaptive quantizers 21 and 31. It should be understood that the minimum is 2 bits and the maximum is 6 bits, as mentioned above. This is made for the purpose of ensuring updating of the step sizes at all times. That is, more than two bits of data are necessary for updating step size by using equation (1). An information signal regarding the bit assignment is applied to the two adaptive quantizers 21 and 31 and also to the multiplexer 41. The multiplexer 41 rearranges the signals from two adaptive quantizers 21 and 31 and then delivers the rearranged signals. One format of the signal rearrangement is exemplified in FIG. 5. Let us assume that the adaptive quantizer 21 quantizes a signal to output 3 bits $a_1$, $a_2$ and $a_3$, while the adaptive quantizer 31 quantizes a signal to output a signal of 5 bits $b_1$ to $b_5$. When the bits are rearranged as shown in FIG. 5, decoding becomes easy because heading bits $a_1$ and $b_1$ are exactly identified when the format is read by adaptive inverse quantizers 61 and 71 of the decoder. The signals rearranged in the multiplexer 41 as described above are outputted via a terminal 3.

In the decoder, a received signal is applied to a demultiplexer 51 via a terminal 4. The demultiplexer 51 merely supplies to an adative inverse quantizer 61 the left-hand side 6 bits of the received signal shown in FIG. 5 and supplies to an adaptive inverse quantizer 71 the right-hand 6 bits. As shown in FIG. 4, in the adaptive inverse quantizer 61, a signal 200 is applied to an inverse quantizer circuit 610 and an adaptive circuit 612. A quantization bit number at this time is inputted as a signal 202 from a bit assigning circuit 81. An output signal of the inverse quantizing circuit 610 is supplied to a gain control circuit 611 where this signal is multiplied with a step size $\Delta_j'$ which can be obtained through the same algorithm as that pursuant to equation (1). Accordingly, if the assignment of the bit number is correct and there is no transmission error, the step size $\Delta_j$ obtained by the adaptive circuit 212 would coincide with $\Delta_j'$. Where quantization is does with sufficient fineness, an output signal 203 of the gain control circuit 611 would have a value sufficiently close to signal 100. The adaptive inverse quantizer 71 operates in the same manner as the adaptive inverse quantizer 61. The bit assigning circuit 81 is supplied with step sizes from the two adaptive inverse quantizers 61 and 71 so as to effect bit assignment in the same manner as the adaptive bit assigning circuit 11. Increase or decrease in the quantization bit number may be carried out by adding or removing bits on the LSB side or by changing the quantizing characteristic. Details of the bit assigning circuits 11 and 81 are described in U.S. Pat. No. 4,184,049, for example.

As described above, according to the first embodiment of this invention, since it is not necessary to transmit bit assignment information and measure the signal level for bit assignment, not only can the device be simplified but also there is no delay of signal.

Figure 7:
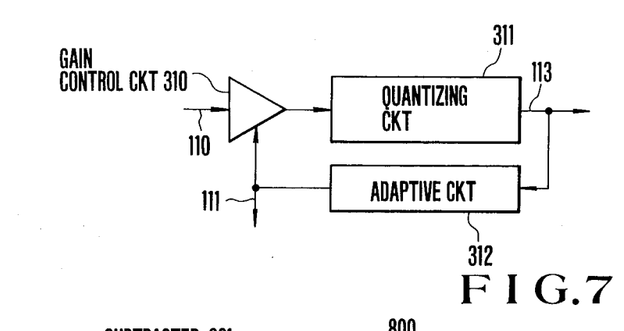
FIGS. 7 and 8 are block diagrams respectively showing the adaptive quantizer and the adaptive inverse quantizer utilized in the second embodiment of this invention.
Figure 8:
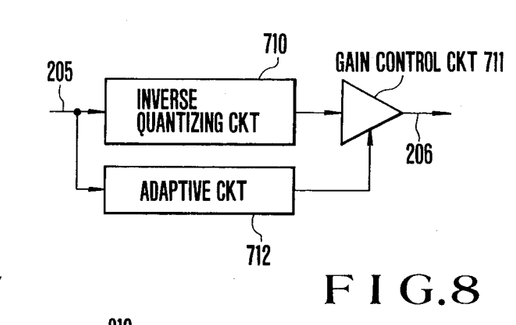

FIG. 6 shows a second embodiment of this invention. Since this embodiment resembles the first embodiment, only the principal difference between them will be described. FIGS. 7 and 8 show examples of adaptive quantizer 22 and adaptive inverse quantizer 62.

In the encoder, substantially the same operation as in the first embodiment is performed. The second embodiment is different from the first embodiment in that an adapative circuit 312 shown in FIG. 7 does not utilize all the bits of a quantizing circuit 311 but uses only a portion of the bits to change the step size. In other words, the adaptive circuit 312 is supplied with only uppermost bits of a predetermined number. Where the bits are distributed in the same manner as the first embodiment, only two uppermost bits are inputted to the adaptive circuit 312. The number of bits may be equal to the minimum number of bits to be assigned or to be slightly smaller than the minimum bit number. In the second embodiment, since it is sufficient to use two bits of data for updating step size according to equation (1), the step size is determined by only two uppermost bits obtained as a result of quantization. In the decoder, no circuit for bit assignment is necessary. In an adaptive inverse quantizer 62, an adaptive circuit 712 (see FIG. 8) determines the step size by using only two uppermost bits. An adaptive inverse quantizer 72 also operates in the same manner as an adaptive inverse quantizer 62. Then, the step size of the encoder becomes equal to that of the decoder. In adaptive inverse quantization, even if bits of another channel are simultaneously inputted to the inverse quantizing circuit 710, no additional quantization distortion would be caused. In other words, so long as correct information is inputted, the quantization distortion decreases in proportion thereto, but even when another information signal is inputted to the lowermost bits, the extent of the quantization distortion is the same as that in a case wherein 0 or 1 substitutes therefor (this is equivalent to the removal of the lowermost bits).

Advantageously using the fact that additional bits beyond the least significant bit of actual input data do not increase distortion, the input bit number for an inverse quantizing circuit used in the adaptive inverse quantizers 62 and 72 is set to be a fixed number, e.g. six. In this case, since the input bit number is fixed, the bit assignment circuit is not needed in the decoder.

As described above, according to the second embodiment of this invention, since the bit assignment circuit is not necessary on the decoder side, the apparatus is simpler than that of the first embodiment.

Although, in the first and second embodiment, examples utilizing only adaptive quantization were described, ADPCM (adaptive pulse code modulation) may be used for either one or both channels. In this case, only the minimum number of bits is inputted to means for updating the step size, a local decoder in the encoder and the decoder on the receiving side. By adding lowermost bits to a decoder output, a regenerated signal can be obtained.

Figures 9, 10:
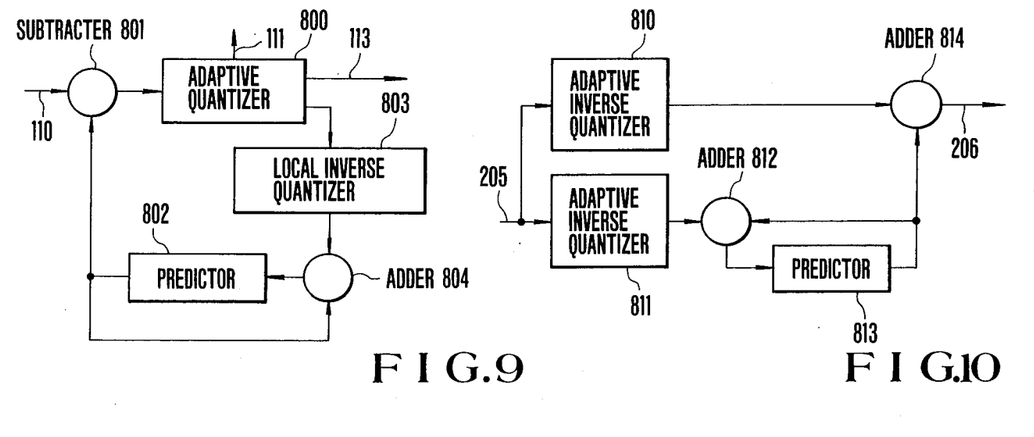
FIGS. 9 and 10 are block diagrams showing portion of an encoder and a decoder utilized in a third embodiment of this invention.

FIGS. 9 and 10 show a third embodiment of this invention using ADPCM. In these Figures, a portion of an encoder and a portion of a decoder are shown. Thus, instead of the adaptive quantizer 22 and the adaptive inverse quantizer 62 of the second embodiment, the embodiment shown in FIGS. 9 and 10 is used and will be described with reference to only these figures. In FIG. 9, the difference between a signal 110 and an output signal of a predictor 802 is obtained by a subtracter 801 and is then applied to an adaptive quantizer 800 which may have the same construction as the adaptive quantizer 22 of the second embodiment. The adaptive quantizer 800 delivers a signal 113 and applies only the two uppermost bits to a local inverse quantizer 803. This local inverse quantizer may be the same as the adaptive inverse quantizer 62 of the second embodiment but inputted with only two bits. The sum of the outputs of the local inverse quantizer 803 and the predictor 802 is obtianed by an adder 804 and inputted to the predictor 802 which may be of the type of an ordinary predictor.

As shown in FIG. 10, on the decoder side, the output of an adaptive inverse quantizer 811 inputted with only two uppermost bits of a signal 205 and the output of a predictor 813 are added together by an adder 812. On the other hand, all bits of the signal 205 are applied to an adaptive inverse quantizer 810. The adaptive inverse quantizers 810 and 811 may have the same construction as the adaptive inverse quantizer 62 of the second embodiment. An adder 814 adds the output of the adaptive inverse quantizer 810 to the output of the predictor 813 to produce a regenerated signal 206. Apart from this embodiment, the same regenerated signal can be obtained by obtaining the sum of the output of adder 812 and the result obtained from inverse quantization only on the lowermost bits.

According to this third embodiment, a coding method for adaptive bit assignment of two channels can be simply obtained by using ADPCM.

Figure 11:
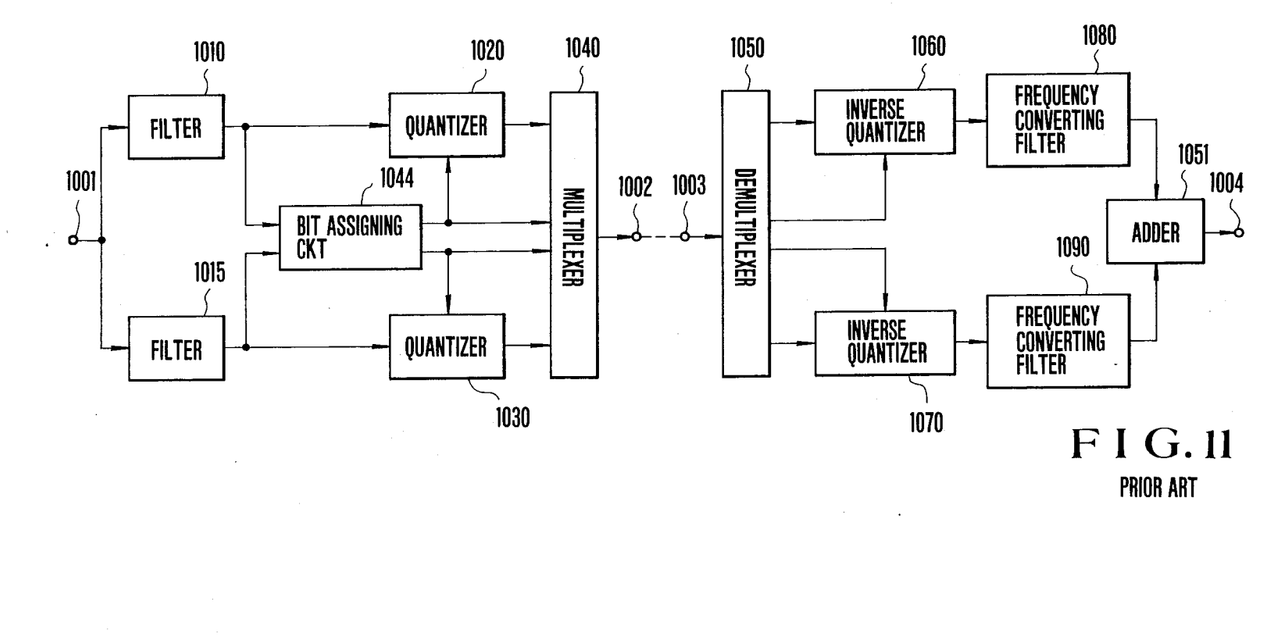
FIG. 11 is a block diagram showing a prior art subband encoder and decoder in which a voice signal is divided into two sub-bands.

FIG. 11 is a block diagram showing a prior art sub-band encoder and decoder, in which a voice signal is divided into two bands. In FIG. 11, the left half shows an encoder while the right half shows a decoder. A voice signal sampled at a frequency of 8 KHz is inputted to an input terminal 1001 and only a low band signal is passed through a filter 1010 so as to be delivered out at a sampling frequency of 4 KHz. A filter 1015 passes only a high band signal which is delivered out at a sampling frequency of 4 KHz. A bit assigning circuit 1044 responds to amplitudes of two signals for determining the quantization step size and the quantization bit number of quantizers 1020 and 1030, where it is assumed that the sum of the bit numbers assigned to the two quantizers is constant. The algorithm for determining the quantization step size and the quantization bit number is described in U.S. Pat. No. 4,142,071 mentioned previously. A multiplexer 1040 is supplied with an information signal regarding quantization from the bit assigning circuit 1044, and output signals of the first and second quantizers 1020 and 1030 and after rearranging these signals, the multiplexer 1040 delivers out a rearranged signal which is transmitted through an output terminal 1002 to enter into the decoder through an input terminal 1003. A demultiplexer 1050 distributes the received signal among first and second inverse quantizers 1060 and 1070 in accordance with the information regarding bit assignment. These inverse quantizers 1060 and 1070 operate reversely to quantizers 1020 and 1030. In other words, they regenerate the original signal based on the quantized signal. An ouput signal of the inverse quantizer 1060 is supplied to a frequency converting filter 1080 which interpolates the output signal of the inverse quantizer 1060 sampled at 4 KHz frequency to sample it at 8 KHz frequency, thereby delivering out an output of low-pass component. A frequency converting filter 1090 supplied with the output signal of the inverse quantizer 1070 interpolates the received signal to sample it at 8 KHz frequency, thereby delivering out an output of high-pass component. An adder 1051 is provided for adding together the outputs of the frequency converting filters 1080 and 1090 to produce a regenerated voice signal at terminal 1004. With this system, the quantization distortion can be decreased as compared to a case wherein equal quantization bit numbers are assigned to the two bands. In other words, where the amplitude of the signal of the low-pass band is larger than that of the signal of the high-pass band, the number of bits assigned to the low-pass band will become large, whereby the SN ratio (signal to quantization distortion ratio) for the low-pass band increases. On the other hand, the number of bits assigned to the high-pass band decreases so that the SN ratio for the low-pass band decreases but the degradation of quality of the signal as a whole is negligible since this signal is small.

Figure 1:
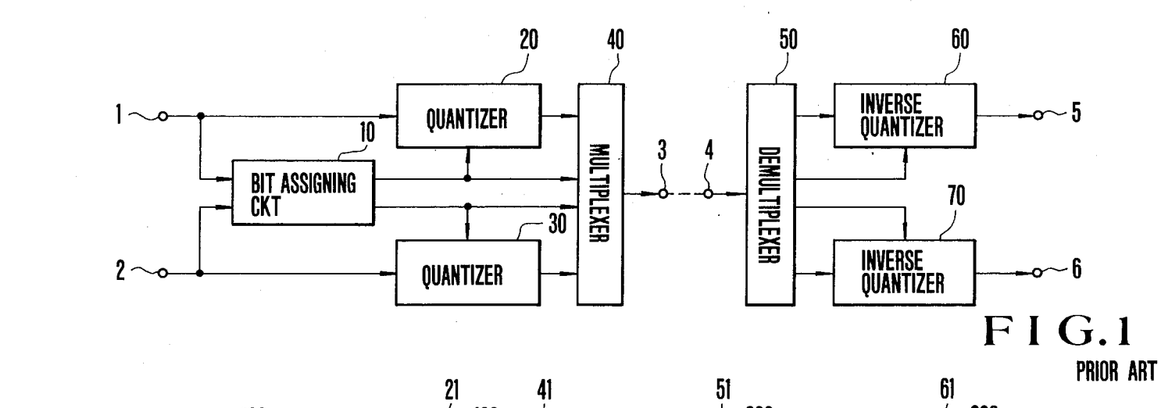
FIG. 1 is a block diagram showing a prior art 2-channel simultaneous encoding and decoding system.

The prior art system shown in FIG. 11 has the same defects as those of the FIG. 1 conventional system.

Figure 12:
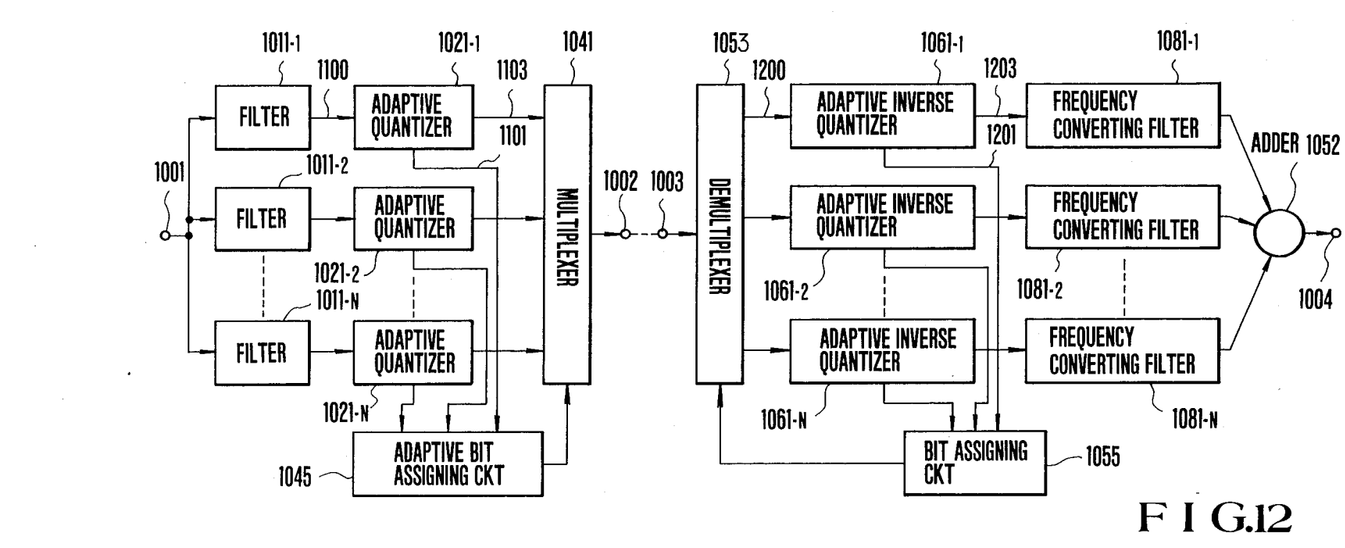
FIG. 12 is a block diagram showing a fourth embodiment of this invention.

FIG. 12 is a block diagram showing a fourth embodiment of this invention in which a signal sampled at a frequency of 8 KHz, applied to an input terminal 1001, is divided into N (a positive integer) sub-bands by filters 1011-1, 1011-2, ..., 1011-N and sampled again in accordance with the bands. The division of the band can be determined by the method described in U.S. Pat. No. 4,142,071 described previously. It is now assumed that N=4, that the divided sub-bands have the same spacing, and that each band is sampled at a frequency of 2 KHz. The sub-bands of the input signal are inputted to adaptive quantizers 1021-1, 1021-2, ..., 1021-N. One of the signals 1100 is quantized by the adaptive quantizer 1021-1. Each of the adaptive quantizers 1021-1, 1021-2, ..., 1021-N has the same construction as shown in FIG. 7. Thus, the signal 1100 is multiplied with a reciprocal $1/\Delta_j$ of the step size $\Delta_j$ in the gain control circuit 310 (FIG. 7). In this case, the circuit shown in FIG. 7 operates in the same manner as described before, so that the step size is updated according to equation (1) mentioned previously.

Figure 13:
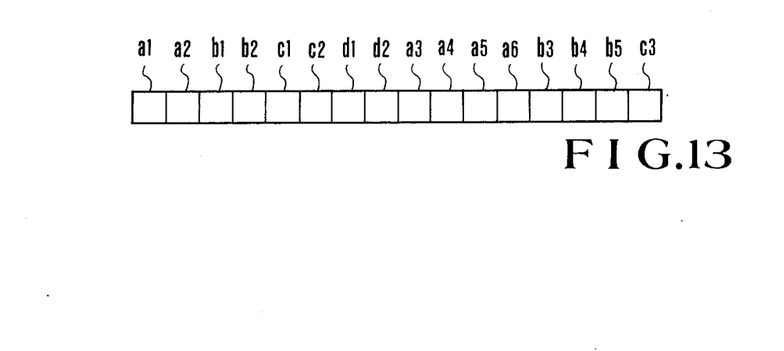
FIG. 13 shows a manner of rearranging output signals of adaptive quantizers shown in FIG. 12.

An output signal 1101 of adaptive quantizer 1021-1 is applied to an adaptive bit assigning circuit 1045 and an output signal 1103 to a multiplexer 1041. The signals of other bands are inputted to adaptive quantizers 1021-2, ..., 1021-N, respectively, to be processed in the same manner as above. Noting that the step sizes outputted from respective adaptive quantizers 1021-1, 1021-2, ..., 1021-N represent the signal subject to AGC, the adaptive bit assigning circuit 1045 compares respective step sizes so as to determine the number of bits assigned to each band, provided that the maximum number of assigned bits is 6, while the minimum number of assigned bits is 2. Each band is sampled at 2 KHz frequency (500 micro second period) so that in order to realize a transmission rate of 32 kbps (killobits per sec.), 16 bits can be used per 500 micro sec. As a consequence, 16 bits are necessary for all channels. The reason why the minimum bit assignment number is set to be 2 is to constantly ensure the updating of the step size. A bit assignment information signal is applied to the multiplexer 1041 which rearranges and delivers the output signals of adaptive quantizers 1021-1, 1021-2, ..., 1021-N. A rearranged format is shown in FIG. 13 in which $a_i$, $b_i$, $c_i$ and $d_i$ show the results of quantization in respective sub-bands. Smaller i represents a higher order bit. In this example, bits of four channels utilized to update the step size are arranged on the beginning portion, and the lower order bits of respective channels are arranged as shown in FIG. 13 according to the bit assignment information. With this measure, the construction of the decoder can be simplified slightly. Of course, bits to be transmitted of one band may be grouped. Signals rearranged in this manner by the mulitplexer 1041 are sent out via an output terminal 1002.

In the decoder, the received signals are applied to a demultiplexer 1053 via a terminal 1003. The demultiplexer 1053 distributes the received signals among respective bands in accordance with bit assigning information from a bit assigning circuit 1055. The bit assigning circuit 1055 is inputted with the step sizes 1201 from respective adaptive inverse quantizers 1061-1, 1061-2, ..., 1061-N to perform the same operation as the bit assigning circuit 1045 of the encoder. Since each step size coincides with that on the encoder side, the received signals will be correctly distributed among respective bands. The output signals of the demultiplexer 1051 are applied to adaptive inverse quantizers 1061-1 1061-2, ..., 1061-N. Each of the adaptive inverse quantizers has the same construction as shown in FIG. 8. In the adaptive inverse quantizer 1061-1, signal 1200 is applied to the inverse quantizing circuit 710 (FIG. 8) and the adaptive circuit 712 (FIG. 8) to perform the same operation as described in connection with FIG. 8.

The adaptive inverse quantizers 1061-2, . . . , 1061-N perform the same processing as the adaptive inverse quantizer 1061-1. The output signals 1203 of the adaptive inverse quantizers 1061-1, 1061-2, . . . , 1061-N are inputted to frequency converting filters 1081-1, 1081-2, . . . , 1081-N so that their frequencies are shifted to the original frequency bands. The output signals of the frequency converting filters 1081-1, 1081-2, . . . , 1081-N are added together by an adder 1052 to form a regenerated signal which is delivered out via an output terminal 1004.

Details of bit assigning circuits 1045 and 1055 used in the fourth embodiment are described in the aforementioned U.S. Pat. No. 4,184,049. Details of the filters 1011 and 1081 are described in U.S. Pat. No. 4,048,443 to R.E. Crochiere et al. It will be appreciated that teachings of the third embodiment described with reference to FIGS. 9 and 10 are applicable to the fourth embodiment in the same manner.

When N =2, the transmission format is the same as that shown in FIG. 5, and a bit assignment circuit is not necessary.

What is claimed is:

1. A two channel simultaneous coding and decoding system comprising:
   an encoder unit including:
      first adaptive quantizing means inputted with a first digital signal through a first channel for quantizing said first digital signal while sequentially updating its step size and outputting a first output signal and a first step size signal indicative of step size of said first adaptive quantizing means;
      second adaptive quantizing means inputted with a second digital signal through a second channel for quantizing said second digital signal while sequentially updating its step size and outputting a second output signal and a second step size signal indicative of step size of said second adaptive quantizing means;
      adaptive bit assigning means connected to said first and second adaptive quantizing means for receiving said first and second step size signals, respectively and adaptively assigning corresponding numbers of bits for said first and second channels, said adaptive bit assigning means further outputting an adaptive bit assignment signal; and
      multiplexer means supplied with said first and second output signals and said adaptive bit assignment signal for rearranging said first and second output signals in accordance with said adaptive bit assignment signal and delivering an encoder input signal; and
   a decoder unit including:
      demultiplexer means for receiving and rearranging said encoder output signal and providing first and second outputs;
      first adaptive inverse quantizing means supplied with said first output of said demultiplexer means for inversely quantizing said first output while sequentially updating its step size; and
      second adaptive inverse quantizing means inputted with said second output of said demultiplexer means for inversely quantizing said second output while sequentially updating its step size,
   wherein information relating to step size of said first and second inverse adaptive quantizing means is generated only in said decoder unit.

2. An encode comprising:
   a first quantizer which receives and quantizes a first digital signal at a first step size while sequentially and adaptively updating said first step size in accordance with a first adaptive bit assigning information signal, said first quantizer outputting a first step size signal indicative of step size of said first adaptive quantizer;
   a second quantizer which receives and quantizes a second digital signal at a second step size while sequentially and adaptively updating said second step size in accordance with a second adaptive bit assigning information signal, said second quantizer outputting a second step size signal indicative of step size of said second adaptive quantizer;
   adaptive bit assigning means responsive to said first and step size signals and outputting said first adaptive bit assigning information signal and said second adaptive bit assigning information signal; and
   a multiplexer for rearranging output signals of said first and second quantizers in accordance with said first and second adaptive bit assigning information signals and outputting an encoder output signal.

3. a decoder comprising:
   a demultiplexer for rearranging a received signal into a first received code and a second received code;
   a first inverse quantizer for receiving and decoding said first received code while sequentially and adaptively updating step size in accordance with a first bit assigning information signal, said first inverse quantizer outputting a first step size signal indicative of step size of said first inverse quantizer;
   a second inverse quantizer for receiving and decoding said second received code for decoding the same while sequentially and adaptively updating step size in accordance with a second bit assigning information signal, said second inverse quantizer outputting a second step size signal indicative of step size of said second inverse quantizer; and
   adaptive bit assigning means responsive to said first and second step size signals for generating said first and second bit assigning information signals.

4. An encoder comprising:
   a first quantizer for receiving and quantizing a first digital signal while sequentially and adaptively updating step size in accordance with a first predetermined number of uppermost bits obtained as a result of quantization, said first quantizer outputting a first step size signal indicative of step size of said first quantizer;
   a second quantizer for receiving and quantizing a second digital signal while sequentially and adaptively updating step size in accordance with a second predetermined number of uppermost bits obtained as a result of quantization, said second quantizer outputting a second step size signal indicative of step size of said second quantizer;
   adaptive bit assigning means responsive to said first and second step size signals for adaptively assigning bits and outputting a bit assignment signal accordingly; and
   a multiplexer for rearranging output signals of said first and second quantizers in accordance with said bit assignment signal and delivering an encoder output signal.

5. A decoder comprising:
a demultiplexer for rearranging a received signal into a first received code and a second received code;
a first inverse quantizer for receiving and decoding said first received code while sequentially and adaptively updating a first step size in accordance with a first predetermined number of uppermost bits; and
a second inverse quantizer for receiving and decoding said second received code while sequentially and adaptively updating a second step size in accordance with a second predetermined number of uppermost bits.

6. A sub-band coding and decoding system comprising:
an encoder unit including:
means for dividing an input voice signal into a plurality of sub-bands;
encoding means having adaptive quantizers for receiving and quantizing signals of respective sub-bands while sequentially updating respective step sizes thereof, said encoding means outputting respective step size signals indicative of said respective step sizes of said adaptive quantizers;
bit assigning means for determining a quantization bit number of respective sub-bands in accordance with said respective step size signals, said bit assigning means outputting respective bit assignment signals; and
means for rearranging output signals of said encoding means in accordance with said respective bit assignment signals and delivering an encoder output signal; and
a decoding unit including:
means for distributing said encoder output signal among said respective sub-bands in accordance with a bit assignment signal generated in said decoding unit and providing respective output signals;
decoding means including adaptive inverse quantizers for decoding said respective output signals while sequentially updating step sizes of said respective output signals, said decoding means providing respective adaptive inverse quantizer output signals accordingly;
means for delivering said bit assignment signal in accordance with said respective output signals; and
means for combining said adaptive inverse quantizer output signals and delivering a decoder output signal.

7. A sub-band encoder comprising:
filter means for dividing an input voice signal into a plurality of sub-bands;
adaptive quantizers for receiving and quantizing signals corresponding to respective ones of said plurality of sub-bands while sequentially updating respective step sizes and providing respective step size signals indicative of respective step sizes of said adaptive quantizers, said adaptive quantizers also providing respective adaptive quantizer output signals;
bit assigning means receiving said respective step size signals for determining distribution of quantized bits among respective sub-bands by regarding said respective step sizes as respective periodic signal levels in said respective sub-bands, said bit assigning means outputting a bit assignment signal; and
a multiplexer rearranging said adaptive quantizer output signals in accordance with said bit assignment signal and delivering an encoder output signal.

8. A sub-band decoder comprising:
a demultiplexer receiving and dividing a received signal and producing a plurality of divided signals corresponding to respective sub-bands in accordance with a bit assigning information signal;
decoding means, including adaptive inverse quantizers for receiving and decoding respective ones of said divided signals while sequentially updating respective step sizes, respective ones of said adaptive inverse quantizers outputting respective step size information signals, said adaptive inverse quantizers further outputting respective quantized signals;
decoded bit assigning means receiving said respective step size information signals for producing said bit assigning information signal by regarding said respective step sizes as periodic signal levels in said respective sub-bands; and means for combining said respective quantized signals to form a regenerated voice signal, wherein said bit assigning information signal is generated only in said sub-band decoder.

* * * * *

UNITED STATES PATENT AND TRADEMARK OFFICE
CERTIFICATE OF CORRECTION

PATENT NO. : 4,713,776

DATED : December 15, 1987

INVENTOR(S) : ARASEKI

It is certified that error appears in the above-identified patent and that said Letters Patent is hereby corrected as shown below:

COLUMN 3, LINE 41   Delete "amoung" and insert --among--;

COLUMN 5, LINE 13   Delete "adative" and add --adaptive--;

COLUMN 6, LINE 56   Delete "obtianed" and insert --obtained--;

COLUMN 9, LINE 58   Delete "input" and insert --output--;

Signed and Sealed this

Fourth Day of October, 1988

Attest:

DONALD J. QUIGG

Attesting Officer

Commissioner of Patents and Trademarks